US00RE49642E

(19) United States
(12) Reissued Patent
Song et al.

(10) Patent Number: US RE49,642 E
(45) Date of Reissued Patent: Sep. 5, 2023

(54) VEHICLE PEDAL APPARATUS

(71) Applicants: Hyundai Motor Company, Seoul (KR); Kia Motors Corporation, Seoul (KR)

(72) Inventors: Ki Young Song, Suwon-si (KR); Jae Sung Heo, Hwaseong-si (KR); Eun Sik Kim, Gwangmyeong-si (KR)

(73) Assignees: HYUNDAI MOTOR COMPANY, Seoul (KR); KIA MOTORS CORPORATION, Seoul (KR)

(21) Appl. No.: 17/501,352

(22) Filed: Oct. 14, 2021

Related U.S. Patent Documents

Reissue of:
(64) Patent No.: 10,303,198
Issued: May 28, 2019
Appl. No.: 15/836,136
Filed: Dec. 8, 2017

(30) Foreign Application Priority Data

Jul. 13, 2017 (KR) ..... 10-2017-0089102

(51) Int. Cl.
*G05G 1/30* (2008.04)
*G05G 1/50* (2008.04)
*G05G 1/46* (2008.04)
*G05G 1/44* (2008.04)

(52) U.S. Cl.
CPC ..... *G05G 1/46* (2013.01); *G05G 1/30* (2013.01); *G05G 1/506* (2013.01); *G05G 1/44* (2013.01)

(58) Field of Classification Search
CPC ..... G05G 1/30; G05G 1/44; G05G 1/445; G05G 1/46; G05G 1/50; G05G 1/506; B60K 17/08; B60T 7/04; B60T 7/06
See application file for complete search history.

(56) References Cited

U.S. PATENT DOCUMENTS 4,356,740 A * 11/1982 Kubo ..... B60K 26/02 74/560
4,910,962 A * 3/1990 Keane ..... B60T 7/04 60/589
5,074,163 A * 12/1991 Baumann ..... G05G 1/30 192/99 S (Continued)

FOREIGN PATENT DOCUMENTS

CN 1164490 A 11/1997
CN 201099179 Y 8/2008

(Continued)

OTHER PUBLICATIONS

Korean Notice of allowance dated Dec. 2, 2021, issued in corresponding Korean Patent Application No. 10-2017-0089102.

(Continued)

*Primary Examiner* — Patricia L Engle
(74) *Attorney, Agent, or Firm* — Morgan, Lewis & Bockius LLP

(57) ABSTRACT

A vehicle pedal apparatus includes a pedal member installed to be fixed to a dashboard; and a pedal arm rotatably connected to pedal member, elongated in a vertical direction, and including a lower portion that is bent sideways with respect to a front-and-rear direction of a vehicle body, to extend in a first lateral direction and an upper portion that has a first side indented in a second lateral direction opposite to the first lateral direction.

14 Claims, 6 Drawing Sheets

(56) References Cited

U.S. PATENT DOCUMENTS 5,090,201 A * 2/1992 Smith ..... B60T 7/04 60/533
5,435,205 A * 7/1995 Seksaria ..... G05G 1/30 74/512
5,575,181 A * 11/1996 Baumann ..... B60K 23/02 74/512
5,690,000 A * 11/1997 Terrel ..... B60T 7/06 74/560
6,513,407 B1 * 2/2003 Higgins ..... G05G 1/30 74/560
7,383,752 B2 * 6/2008 Suzuki ..... B60R 21/09 180/274
9,003,920 B2 * 4/2015 Nagahori ..... B21D 53/88 74/512
9,176,517 B2 * 11/2015 Pelletier ..... G05G 1/38
9,632,525 B2 * 4/2017 Kaijala ..... G05G 1/38
9,645,600 B2 * 5/2017 Willemsen ..... G05G 1/44
2002/0023516 A1 * 2/2002 Frobel ..... B60K 26/02 74/512
2002/0108463 A1 * 8/2002 Shaw ..... G05G 1/30 74/512
2005/0188781 A1 9/2005 Suzuki
2011/0094329 A1 * 4/2011 Himetani ..... G05G 1/506 74/512
2011/0094330 A1 * 4/2011 Himetani ..... B60T 7/06 219/137 R
2011/0252919 A1 10/2011 Nagahori et al.
2013/0133473 A1 * 5/2013 Kim ..... B60K 26/02 74/567
2013/0326856 A1 12/2013 Pelletier et al.
2014/0076095 A1 * 3/2014 Hemmege Venkatappa ..... G05G 1/44 74/512
2014/0116192 A1 * 5/2014 Hemmege Venkatappa ..... G05G 1/44 74/512
2014/0174894 A1 * 6/2014 Park ..... B60K 23/02 200/61.89
2016/0039460 A1 * 2/2016 Watanabe ..... G05G 1/506 296/203.01

FOREIGN PATENT DOCUMENTS

CN 102233869 A 11/2011
CN 102785573 A 11/2012
CN 104842787 A 8/2015
CN 105365795 A 3/2016
DE 203 06 538 U1 8/2003
DE 20306538 U1 * 8/2003 ..... G05G 1/30
DE 10 2013 015 741 A1 7/2014
DE 102013015741 A1 * 7/2014 ..... B60K 26/02
DE 10 2014 208 247 A1 11/2014
EP 1 331 150 A1 7/2003
EP 1331150 A1 * 7/2003 ..... B29C 37/0082
EP 1 659 017 A1 5/2006
EP 1659017 A1 * 5/2006 ..... B60K 23/02
JP 2002-187536 A 7/2002
JP 2005-231548 A 9/2005
JP 2007-001372 A 1/2007
JP 2011-227738 A 11/2011
KR 10-2003-0083378 A 10/2003
WO 2018/003039 A1 1/2018
WO WO-2018003039 A1 * 1/2018 ..... G05G 1/50

OTHER PUBLICATIONS

Chinese Office Action dated Aug. 23, 2022, issued in corresponding Chinese Patent Application No. 201711247071.1.
Machine translation of EP 1331150 A1 obtained on May 17, 2018. (Year: 2018).*

* cited by examiner

VEHICLE PEDAL APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application claims priority to Korean Patent Application No. 10-2017-0089102, filed Jul. 13, 2017, the entire contents of which is incorporated herein for all purposes by this reference.

TECHNICAL FIELD

The present disclosure relates to a vehicle pedal apparatus including a pedal arm shaped to have enhanced strength.

BACKGROUND

A clutch is typically installed between a flywheel and a transmission input shaft to control power transmission from an engine to a transmission. A clutch disengages a transmission from an engine at the time of starting an engine or shifting a transmission gear, but slowly engages a transmission with an engine so that a vehicle can start moving and can be driven by the power of the engine.

Specifically, in the case of a manual transmission, when a shift lever is manipulated to change a transmission gear, it is necessary to interrupt power transmission from an engine to a transmission. In this case, a driver depresses a clutch pedal to interrupt power transmission from an engine.

In the case in which a driver shifts a shift lever to change a transmission gear after interrupting power transmission between an engine and a transmission by depressing a clutch pedal, and subsequently releases the clutch pedal, the clutch pedal is returned to an original position by hydraulic pressure of a master cylinder.

Clutch pedals are generally made of steel. Therefore, the raw material cost and weight of clutch pedals are high. Furthermore, since steel has low formability (moldability), it is difficult to form a complex structure with steel. For this reason, plastic clutch pedals have been developed. Plastic clutch pedals offer many advantages, for example, reduction in raw material costs and weight, and good formability of a complex structure.

However, plastic pedals are structurally weak when a connection portion between a pad depressed by a driver's foot and a master cylinder is long. That is, when a pedal arm is shaped to be bent sideways, stress is concentrated on the bent portion when the pedal is depressed. Consequently, the plastic pedal is prone to breaking.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and an object of the present disclosure is to provide a vehicle pedal apparatus having enforced strength such that a pedal arm thereof may not be easily broken even with an increased lateral offset of a connection portion between a pad and a master cylinder.

According to one aspect, there is provided a vehicle pedal apparatus including: a pedal member fixed to a dashboard; and a pedal arm rotatably connected to the pedal member, elongated in a vertical direction, and including a lower portion that is bent sideways with respect to a front-and-rear direction of a vehicle body to extend in a first lateral direction and an upper portion that has a first side indented in a second lateral direction opposite to the first lateral direction.

The pedal arm may include: an upper arm portion that is connected to the pedal member to be rotatable in the front-and-rear direction, extends obliquely downward, and has the first side indented toward a second side thereof such that the first side has a concavity; and a lower arm portion that is integrated with the upper arm portion, bent to obliquely extend in the first lateral direction from the upper arm portion, and having a pad at a lower end thereof.

The upper arm portion may be bent such that an upper portion thereof extends rearward and obliquely downward and a lower portion extends forward and obliquely downward.

The upper arm portion may have an internal space that is open at the first side or the second side and the internal space may have a main rib that vertically extends across the internal space.

The main rib may be arranged, in the internal space, to be close to the concavity provided at the first side of the upper arm portion.

The internal space may have a plurality of central members extending from the first side to the second side that is open and a plurality of auxiliary ribs extending from one of the central members in radial directions and being connected to an adjacent central member of the central members.

The lower arm portion may have an internal space that is open at a front side and a reinforcing rib provided in the internal space to extend across the internal space.

The pedal member may have a master cylinder, and the second side of the upper arm portion may have a support portion with which a push rod of the master cylinder comes into contact.

The support portion of the upper arm portion may be formed to surround an end of the push rod and may be supported by a plurality of support ribs extending rearward.

The support ribs may include a first rib horizontally extending rearward from the support portion and a second rib and a third rib extending obliquely upward and downward, respectively at a predetermined angle with respect to the first rib.

The pedal member may have a pedal switch, and the second side of the upper arm portion has an operation pin that protrudes in the second lateral direction and which connects with the pedal switch.

A plurality of protrusion ribs may be arranged in a circumferential direction of the operation pin such that the operation pin is supported by the protrusion ribs.

The pedal member may have a spring mechanism connected to a front end of the upper arm portion, the spring mechanism providing elastic force that returns the pedal arm from a rotated position to an original position.

The front end of the upper arm portion may have a fixing portion protruding forward, and the spring mechanism may include: a piston mechanism having a first end rotatably connected to the pedal member and a second end rotatably connected to the fixing portion; and a spring surrounding the piston mechanism.

The pedal arm may be made of a plastic material.

The vehicle pedal apparatus having the structure described above is made of a plastic material. Therefore, the vehicle pedal apparatus offers advantages of reduction of raw material costs, reduction of weight, and increase in formability (moldability). Furthermore, since the strength of the pedal arm is increased, durability of the vehicle pedal apparatus is improved.

BRIEF DESCRIPTION OF THE DRAWINGS

The above and other objects, features, and other advantages of the present disclosure will be more clearly understood from the following detailed description taken in conjunction with the accompanying drawings, in which.

DETAILED DESCRIPTION

Hereinafter, a vehicle pedal apparatus according to an exemplary embodiment of the present disclosure will be described with reference to the accompanying drawings.

Figure 1:
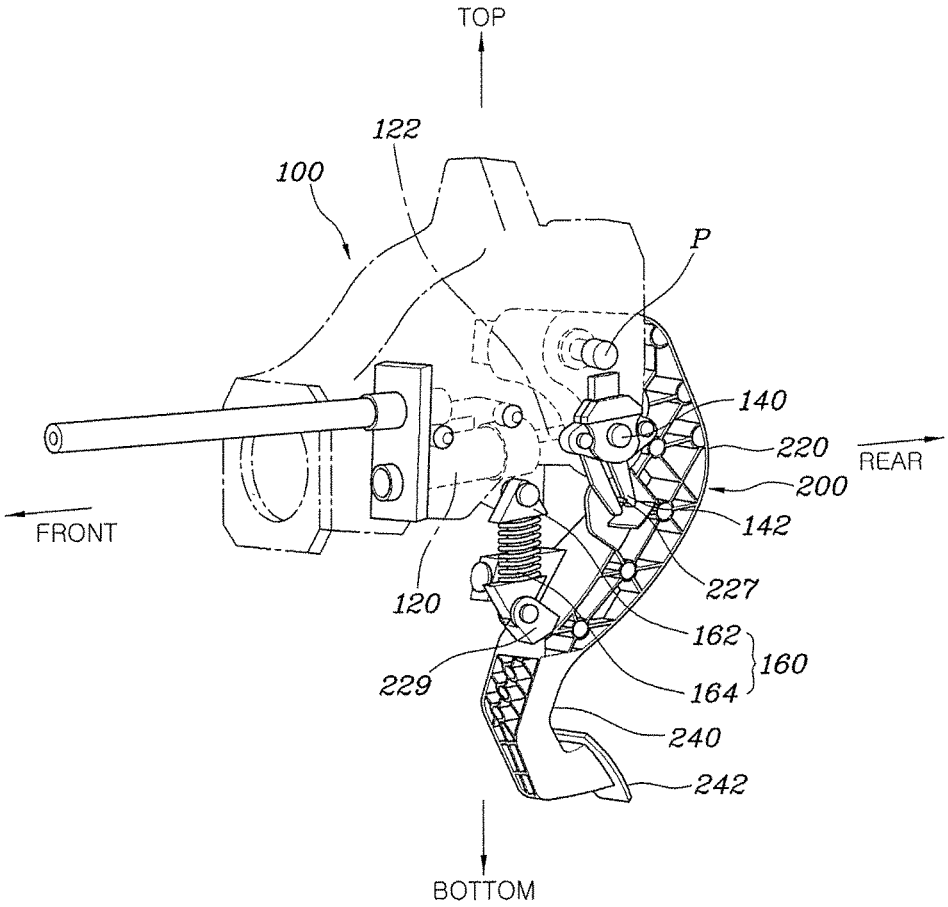
FIG. 1 is a schematic view illustrating a vehicle pedal apparatus according to one embodiment of the present disclosure.

FIG. 1 is a schematic view illustrating a vehicle pedal apparatus according to one embodiment of the present disclosure, and FIGS. 2 to 6 are schematic views describing the vehicle pedal apparatus of FIG. 1.

As illustrated in FIG. 1, a vehicle pedal apparatus according to one embodiment of the present disclosure includes a pedal member 100 and a pedal arm 200. The pedal member 100 is fixed to a dashboard. The pedal arm 200 is rotatably connected to the pedal member 100. The pedal arm 200 is elongated in a vertical direction and is bent sideways. That is, a lower portion of the pedal arm 200 is bent sideways with respect to a front-and-rear direction of a vehicle, to extend in a first lateral direction, and an upper portion of the pedal arm 200 is shaped such that a first side thereof is indented in a second lateral direction opposite to the first lateral direction.

The pedal member 100 is installed to be fixed to the dashboard and the pedal arm 200 is installed to be rotatable. The vehicle pedal apparatus further includes a master cylinder 120 that interlockingly operates with rotary motion of the pedal arm 200, a pedal switch 140, and a spring mechanism 160.

Specifically, the pedal arm 200 is made of a plastic material. In addition, the position of the pedal arm connected to a push rod 122 of the master cylinder 120 described below is distanced from the position of a pad 242 depressed by a driver's foot. The pedal arm 200 is bent sideways to extend in the first lateral direction that is at an angle with respect to the front-and-rear direction of the vehicle body. Therefore, the pedal arm 200 having the structure described above can prevent stress from being concentrated on the bent portion thereof, so that the pedal arm 200 does not suffer from deterioration in durability.

To this end, the pedal arm 200 of the present disclosure is rotatably connected to the pedal member 100, is bent sideways to extend in the first lateral direction that is at an angle with respect to the front-and-rear direction of the vehicle body. In addition, the first side of the pedal arm is indented in the second lateral direction which is reversed to the direction in which the pedal arm is bent.

In the case of a conventional pedal arm, the pedal arm is vertically elongated and a lower portion thereof is bent sideways, so that an upper portion thereof is formed to be thicker than the lower portion. Therefore, when the pedal arm is rotated in accordance with a driver's pedal depression operation, stress is concentrated on the lower portion that is bent, so that the lower portion is likely to be easily broken.

In order to solve the problem of the conventional art, the pedal arm 200 of the present disclosure is shaped such that the lower portion thereof is bent sideways to extend in the lateral direction that is at an angle with respect to the front-and-rear direction of the vehicle body and the first side of the upper portion thereof is indented in a direction reversed to the direction in which the lower portion is bent. Thus, the difference between the strength of the upper portion and the strength of the lower portion of the pedal arm 200 is not significantly large. Therefore, when the pedal arm 200 is rotated in accordance with a driver's pedal depression operation, stress is not concentrated on the lower portion that is bent, but is distributed to the upper portion of the pedal arm 200 as well as the lower portion of the pedal arm 200. Therefore, it is possible to prevent breaking of the pedal arm attributable to stress concentration.

Figure 2:
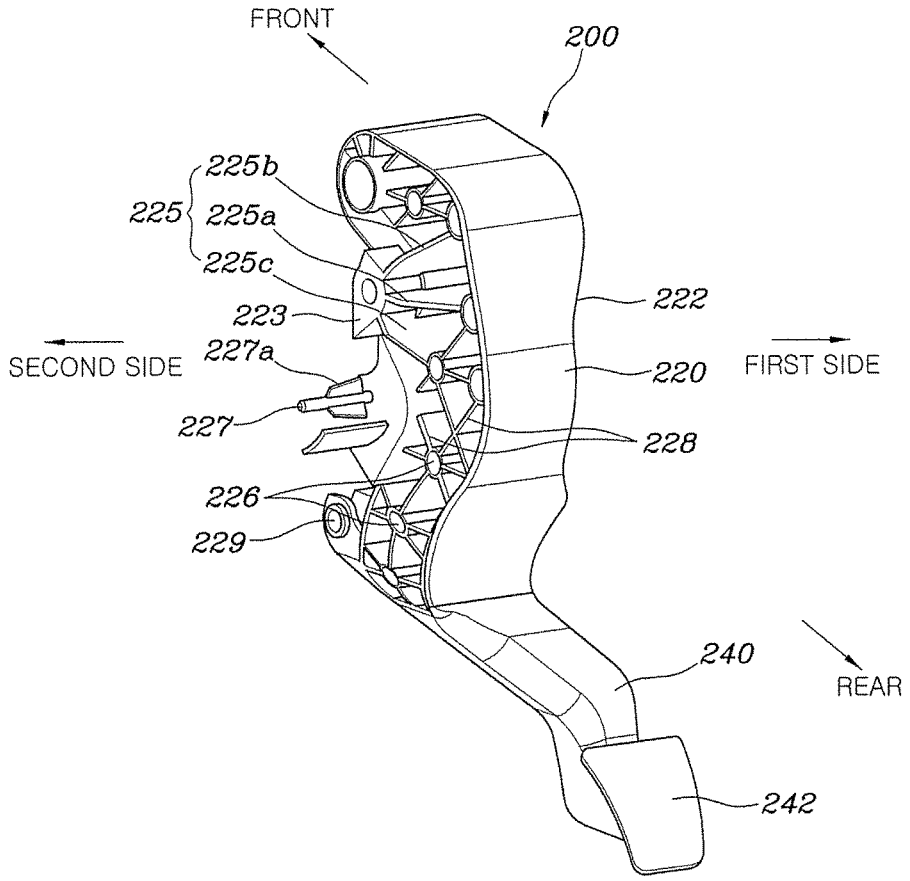
FIGS. 2 to 6 are schematic views describing the vehicle pedal apparatus of FIG. 1.

The present disclosure will be described below in more detail. As illustrated in FIGS. 1 and 2, the pedal arm 200 includes an upper arm portion 220 and a lower arm portion 240. The upper arm portion 220 is rotatably connected to the pedal member 100 to be rotatable in the front-and-rear direction of the vehicle body. The upper arm portion 220 extends downward and has the first side that is indented toward the second side (opposite side of the first side) thereof to have a concavity 222 at the first side. The lower arm portion 240 is formed unitary with the upper arm portion 220 and extends downward from an end of the upper arm portion 220. The lower arm portion 240 is also bent sideways and is provided with a pad 242 at a lower end thereof.

That is, the pedal arm 200 includes the upper arm portion 220 that is rotatably connected to the pedal member 100 via a hinge pin P and the lower arm portion 240 unitarily formed with the upper arm portion 220 and equipped with the pad 242. Here, the first side of the upper arm portion 220 is provided with the concavity 222 that is concave toward the second side (opposite side). The lower arm portion 240 obliquely extends in the direction in which the concavity 222 is formed. Thus, a thickness difference between the upper arm portion 220 and the lower arm portion 240 can be reduced. Therefore, it is possible to prevent stress from being concentrated. That is, it is possible to uniformly distribute the stress, thereby preventing the pedal arm 200 from being broken.

Figure 3:
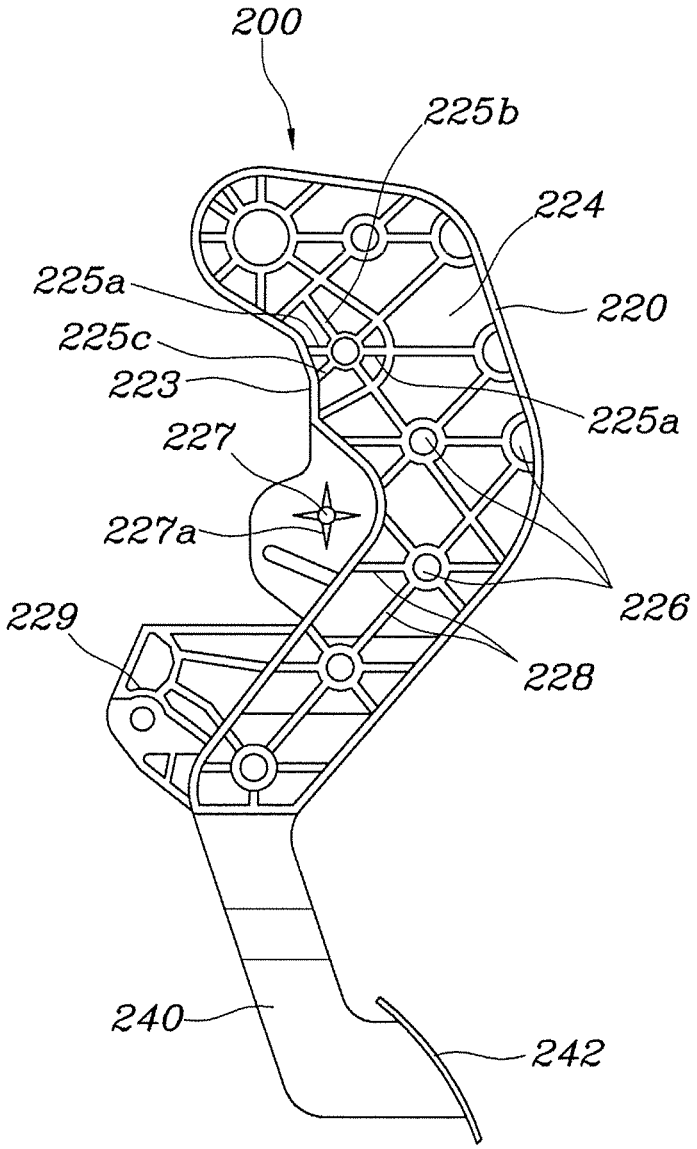

Referring to FIG. 3, the upper arm portion 220 is bent such that it is inclined rearward at an upper portion thereof and is then inclined forward at a lower portion thereof, thereby securing sufficient strength resisting the force applied in a rear-to-front direction by a driver's foot depression operation. As to the upper arm portion 220, an angle between the upper portion thereof that is inclined rearward and the lower portion thereof that is inclined forward is set to be about 90°. The angle may vary depending on the required strength of the pedal arm and the shape of the internal space of the upper arm portion of the pedal arm.

Figure 4:
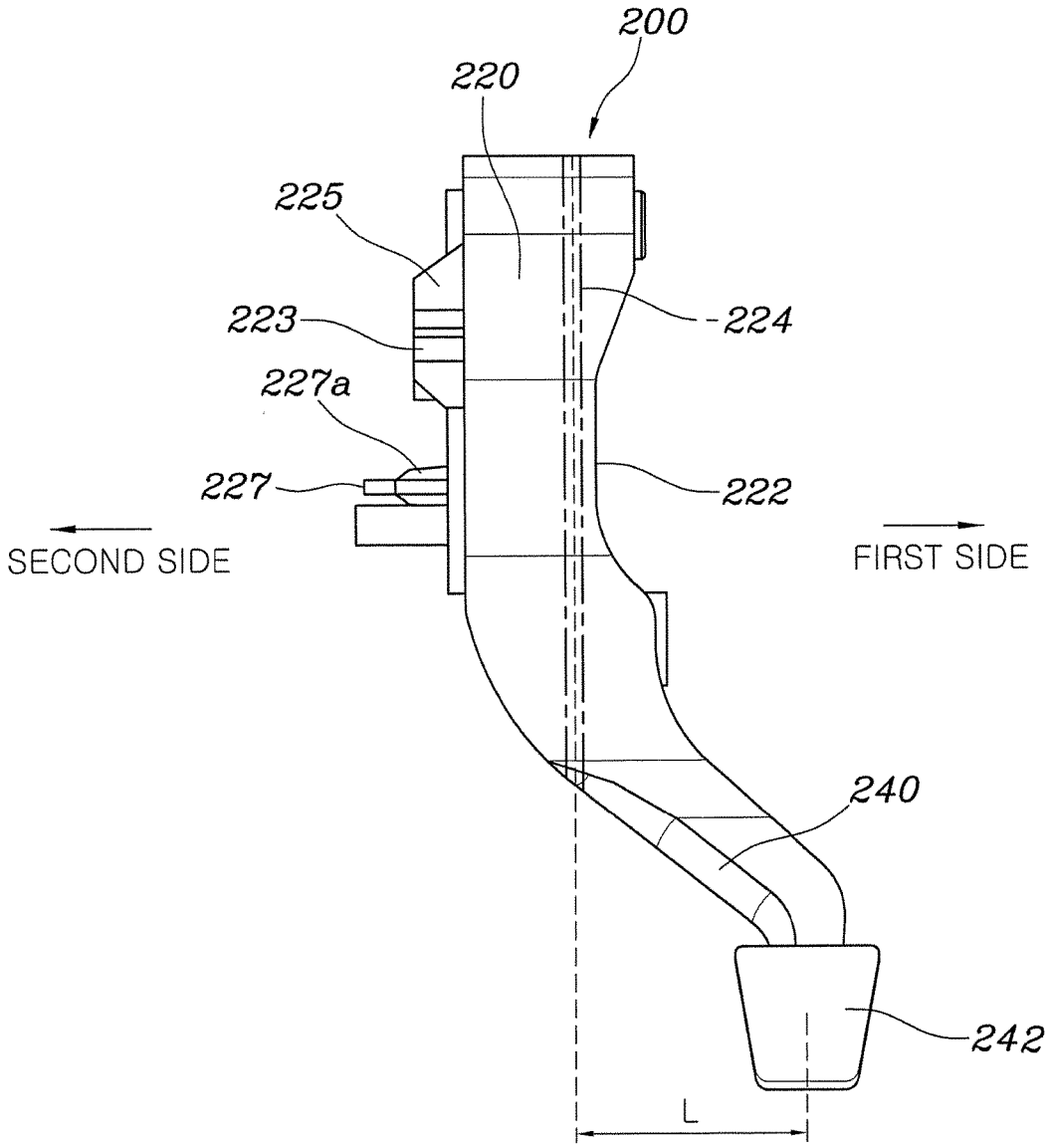

Meanwhile, as illustrated in FIGS. 3 to 4, the upper arm portion 220 has the internal space that is open at the first side or the second side. The internal space of the upper arm portion 220 is provided with a main rib 224 vertically extending across the internal space.

Here, although any side of the first and second sides of the upper arm portion 220 can be open, the second side may be open. In the present disclosure, since the first side of the upper arm portion 220 of the pedal arm 200 is indented, if the first side of the upper a m portion 220 is open, the pedal arm is structurally weak. Therefore, the second side of the upper arm portion 220 may be open.

Since the main rib 224 is installed in the internal space of the upper arm portion 220 in a manner of vertically extending across the internal space of the upper arm portion 220, the main rib 224 increases the strength of the upper arm portion 220. Here, as illustrated in FIG. 3, since the main rib 224 vertically extends, it can be formed to entirely cover the internal space of the upper arm portion 220. The main rib 224 may be composed of one rib or a plurality of ribs arranged at regular intervals in the internal space of the upper arm portion 220.

Figure 5:
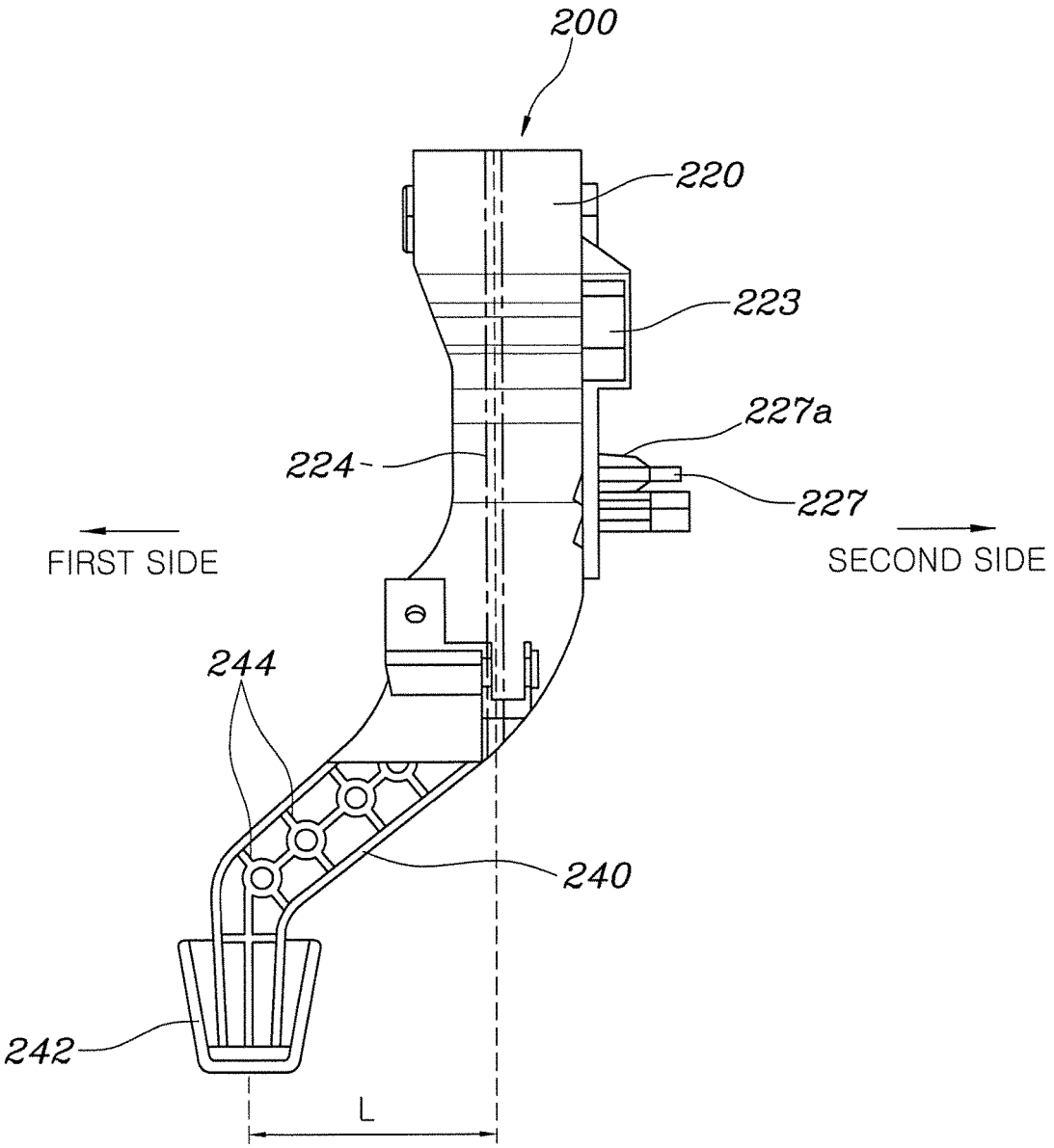

Specifically, the main rib 224 is arranged to be closer to the first side of the upper arm portion 220. As illustrated in FIGS. 4 and 5, the main rib 224 is disposed to be shifted to be closer to the first side of the upper arm portion 220 from the center of the internal space in the lateral direction. Therefore, it enhances the strength of the upper arm portion 220, which is likely to be weakened due to the concavity 222. In addition, since a distance 'L' between the pad 242 of the lower arm portion 240 and the main rib 224 is reduced, durability of the pedal arm is improved.

Specifically, in the pedal, when a distance between the position of the push rod 122 of the master cylinder 120 and the position of a point of the pad 242 depressed by a driver's foot is long, the strength of the pedal arm 200 is reduced. In the present disclosure, the main rib 224 of the upper arm portion 220 is disposed closer to the first side of the upper arm portion 220 than the push rod 122 of the master cylinder 120, and is formed to support the upper arm portion 220. Therefore, the distance 'L' between the main rib 224 and the depression point of the pad 242 is reduced, thereby securing the strength of the pedal arm 200 and accordingly improving the durability of the pedal arm 200.

Referring back to FIG. 3, the internal space of the upper arm portion 220 is provided with a plurality of central members 226 extending from the first side to the second side (which is open) and a plurality of auxiliary ribs 228 extending from a certain central member of the central members 226 in radial directions and being connected to adjacent central members of the central members 226.

The central members 226 are dispersed in the internal space and fixed to the first side surface of the upper arm portion 220, and the auxiliary ribs 228 are provided to extend from the central members 226 in radial directions. Therefore, the overall strength of the upper arm portion 220 is secured and thus the durability thereof is improved. The auxiliary ribs 228 may be dispersed over the entire area within the internal space of the upper arm portion 220. The shape and size of the auxiliary ribs 228 may vary depending on the positions of the central members 226.

Meanwhile, as illustrated in FIGS. 1 and 5, the lower arm portion 240 has an internal space that is open at the front side thereof The internal space of the lower arm portion 240 is provided with a reinforcing rib 244 extending across the internal space. Since the lower arm portion 240 has the internal space that is open at the front side, when the pedal arm 200 is viewed from the driver's seat, the open side of the pedal arm 200 is not seen. Since the reinforcing rib 233 extends over the entire length of the internal space of the lower arm portion 240, the strength of the lower arm portion 240 can be secured.

The pedal member 100 is further equipped with the master cylinder 120 that is a device to generate hydraulic pressure when the pad of the pedal apparatus is depressed. Thus, the pedal member 100 is generally provided to a clutch pedal. The master cylinder 120 includes the push rod 122 connected to the pedal arm 200, and the push rod 122 may be connected to the support portion 223 provided to the second side of the pedal arm 200.

Figure 6:
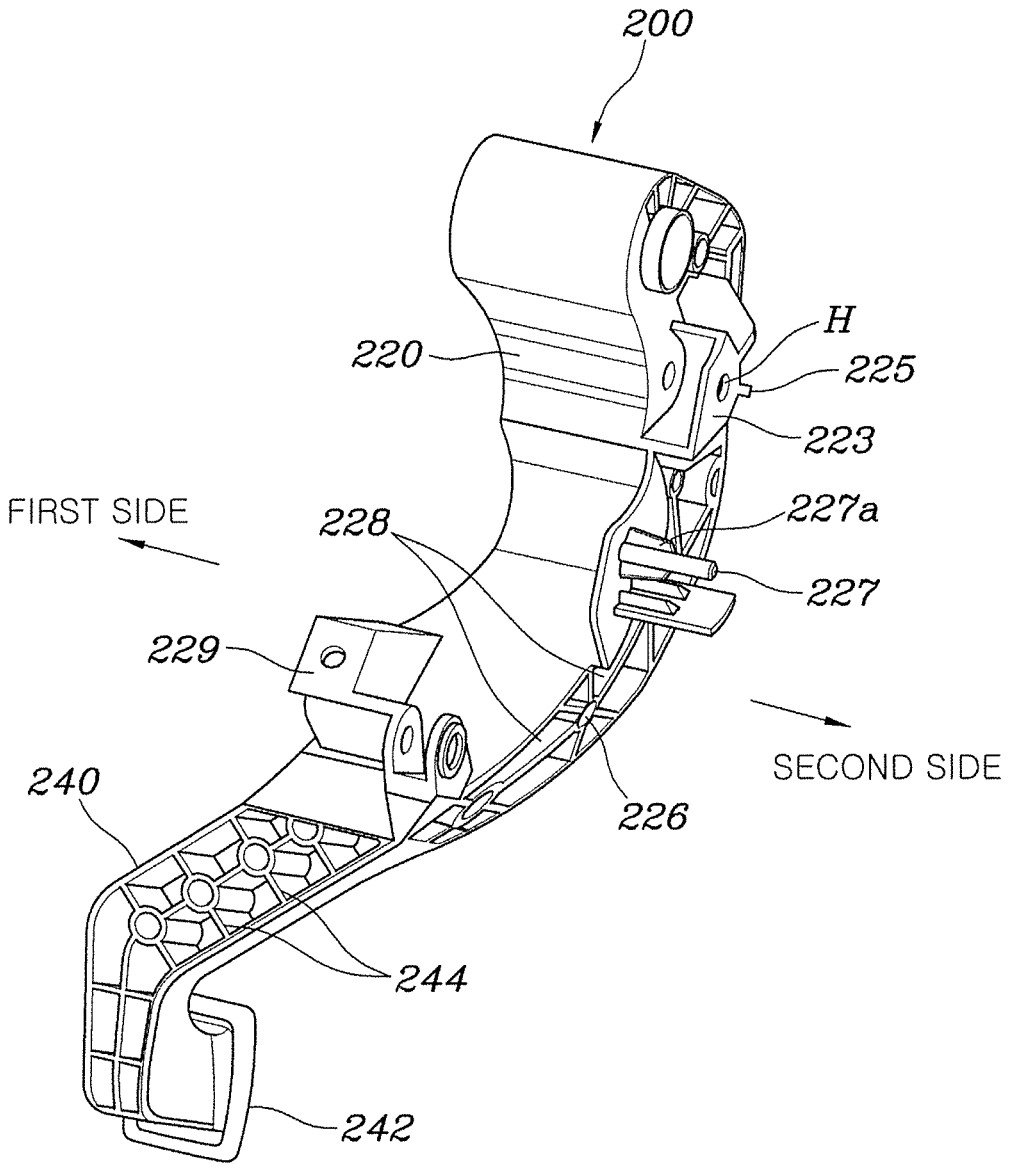

As illustrated in FIG. 6, the support portion 223 is famed in a semi-circular shape that is open at the rear side. Further, the support portion 223 is provided with a hole H through which a hinge pin passes such that the push rod 122 is rotatable. Thus, in the state in which the push rod 122 is inserted in the support portion 223, the push rod 122 performs linear motion with respect to the master cylinder 120 according to the rotary motion of the pedal.

Specifically, the support portion 223 protrudes from the second side of the upper arm portion 220, is formed to surround an end of the push rod 122, and is supported by a plurality of support ribs 225 extending rearward. Since the support portion 223 protrudes from the second side of the upper arm portion 220, stress attributable to the force applied to the pedal can be distributed over the entire area of the pedal arm 200. Furthermore, since the support portion 223 is supported by the support ribs 225, strength of the pedal arm can be secured.

The support ribs 225 are composed of a first rib 225a horizontally extending rearward from the support portion 223, and a second rib 225b and a third rib 225c extending obliquely upward and downward, respectively at a predetermined inclination angle with respect to the first rib 225a. For example, the second rib 225b extending rearward from the support portion 223 extends obliquely upward at an angle of 45° with respect to the first rib 225a, and the third rib 225c extends obliquely downward at an angle of 45° with respect to the first rib 225a, so that the force of supporting the support portion 223 in the horizontal direction (front-and-rear direction) and in the vertical direction is secured, thereby increasing the strength of the pedal arm. The support ribs 225 extend from the support portion 223 to the internal space of the upper a m portion 220. Therefore, the strength of the pedal arm can be sufficiently secured.

Meanwhile, as illustrated in FIG. 1, the pedal member 100 may include the pedal switch 140. The pedal switch 140 is switched on and off in accordance with operation of the clutch pedal. That is, the pedal switch 140 functions to detect the operation state of the clutch pedal.

The pedal switch 140 may be connected to the operation pin 227 of the upper arm portion 220 of the pedal arm 200. That is, the upper arm portion 220 of the pedal arm 200 is provided with the operation pin 227 that is formed to protrude from the second side of the upper arm portion 220 and to which the pedal switch 140 is connected. The pedal switch 140 includes a connection portion 142 connected with the operation pin 227. The connection portion 142 is provided with a slit-like hole into which the operation pin 227 is inserted. The connection portion 142 is rotatably provided to the pedal switch 140 and interlocks with the rotary motion of the pedal arm 200. Thus, the connection portion 142 can be used to detect the operation of the pedal arm 200.

In addition, as illustrated in FIG. 6, a plurality of protrusion ribs 227a is provided around the operation pin 227 while being arranged in a circumferential direction of the operation pin 227. Therefore, the strength of the operation pin 227 is enhanced because the operation pin 227 is supported by the protrusion ribs 227a. Accordingly, the durability of the operation pin 227 is improved. The protrusion ribs 227a surround the operation pin 227 by being arranged at regular intervals in the circumferential direction of the operation pin 227, thereby enhancing the strength of the operation pin 227. The operation pin 227 may be disposed under the support protrusion 223 which is described above in association with the upper arm portion 220.

As illustrated in FIG. 1, the pedal member 100 is provided with the spring mechanism 160 connected to the front end of the upper arm portion 220 and providing elastic force returning the pedal arm 200 to an original position. The spring mechanism 160 provides depression force and return force by applying elastic force to the pedal arm 200. The spring mechanism 160 includes a piston mechanism 162 having a first end rotatably connected to the pedal member 100 and a second end rotatably connected to a fixing portion 229 and performing piston action, and a spring 164 installed to surround the piston mechanism 162. The piston mechanism 162 includes a circular cylinder and a piston inserted in the circular cylinder. Since the structure and operation of piston mechanisms are well known in the art, a detailed description about the structure and operation of the piston mechanism 162 will be omitted. The front end of the upper arm portion 220 is provided with the fixing portion 229 protruding forward, thereby supporting the piston mechanism 162 and the spring 164 of the spring mechanism 160.

The fixing portion 229 protrudes forward from the front end of the pedal arm at a position at which the upper arm portion 220 and the lower arm portion 240 are connected to each other and enables the spring mechanism 160 seated on the fixing portion 229 to perform vertical elastic motion. Since the piston mechanism 162 is rotatably engaged with the fixing portion 229 and the pedal member 100, the piston mechanism 162 is interlocked with the pedal arm 200, thereby smoothly operating in accordance with rotary portion of the pedal arm 200.

According to the present disclosure described above, the pedal arm 200 is formed such that the lower arm portion 240 is bent sideways at a lower end of the upper arm portion 220, and the upper arm portion 220 is provided with the concavity 222 that is indented in the direction opposite to the direction in which the lower arm portion 240 is bent. Therefore, the stress generated when operation force is applied to the pad 242 can be distributed through the entire area of the pedal arm, i.e. through the upper arm portion 220 and the lower arm portion 240. For this reason, damage to the pedal arm attributable to the concentration of stress can be prevented.

Specifically, as to the structure of the pedal arm 200, the second side of the upper arm portion 220 is provided with the support portion 223 to which the push rod 122 of the master cylinder 120 is connected and the operation pin 227 to which the pedal switch 140 is connected. Therefore, in an injection molding process of the support portion 223 and the operation pin 227, an injection flow rate of a molding material needs to be increased. For this reason, the upper arm portion 220 is provided with the concavity 222 between the support portion 223 and the operation pin 227, thereby securing the required injection flow rate of the molding material for the support portion 223 and the operation pin 227. Accordingly, voids, which are likely to be generated in the support portion 223 and the operation pin 227 during the injection molding process, are reduced. That is, the densities of the support portion 223 and the operation pin 227 are increased.

The vehicle pedal apparatus having the structure described above offers advantages of reduction of raw material costs, reduction of weight, and improvement of formability (moldability) because the pedal arm 200 is made of a plastic material. Furthermore, since the strength of the pedal alum 200 is enhanced, durability of the pedal arm 200 is not deteriorated through pedal depression operations.

In addition, due to the concavity 222 formed in the first side surface of the upper arm portion 220 of the pedal arm 200, an injection flow rate of a molding material is increased at the support portion 223 connected to the push rod 122 of the master cylinder 120 and at the operation pin 227 to which the pedal switch 140 is connected, at the time of producing the pedal arm 200 through an injection molding process. Therefore, the formability (moldability) of the pedal apparatus is improved. As a result, the number of voids generated in the support portion 223 and the operation pin 227 is reduced, so that the density and durability of the pedal apparatus are improved.

Although the exemplary embodiments have been disclosed for illustrative purposes, those skilled in the art will appreciate that various modifications, additions and substitutions are possible, without departing from the scope and spirit of the invention as disclosed in the accompanying claims.

What is claimed is:

1. A vehicle pedal apparatus comprising:

a pedal member fixed to a dashboard; and a pedal arm rotatably connected to the pedal member and elongated in a vertical direction, wherein the pedal arm includes:

a first arm that is bent sideways with respect to a front-and-rear direction of a vehicle body, to extend in a first lateral direction; and a second arm that has a first side indented in a second lateral direction opposite to the first lateral direction such that the first side has a concavity, wherein the second arm is integrally connected to [a lower] *an upper* end of the first arm in a bottom direction of the vehicle body, wherein the second arm is rotatably connected to the pedal member to be rotatable in the front-and-rear direction of the vehicle body, [and]

wherein the pedal arm has a pedal switch, and the second arm has an operation pin which protrudes from a second side in the second lateral direction and which connects with the pedal switch, *and*

*wherein the first arm has an internal space that is open at a front side of the pedal arm and a reinforcing rib disposed in the internal space to extend across the internal space*.

2. The vehicle pedal apparatus according to claim 1, wherein the second arm is concavely bent such that one portion of the second arm extends obliquely downward rearwardly, and another portion of the second arm extends continuously from the one portion and extends obliquely downward forwardly.

3. The vehicle pedal apparatus according to claim 1, wherein the second arm has an internal space that is open [either] at the first side, or the second side thereof, *or at both of the first side and the second side thereof,* and includes a main rib in the internal space while vertically extending across the internal space.

4. The vehicle pedal apparatus according to claim 3, wherein the main rib is arranged, in the internal space, to be close closer to the concavity provided at the first side of the second arm, rather than to the second side of the second arm.

5. The vehicle pedal apparatus according to claim 3, wherein the main rib has a plurality of central members each extending from the first side to the second side that is open, and a plurality of auxiliary ribs extending from one of the central members in radial directions and being connected to an adjacent central member of the central members.

[6. The vehicle pedal apparatus according to claim 1, wherein the first arm has an internal space that is open at a front side of the pedal arm and a reinforcing rib disposed in the internal space to extend across the internal space.]

7. The vehicle pedal apparatus according to claim 1, wherein the pedal member has a master cylinder, and the second side of the second arm has a support portion with which a push rod of the master cylinder comes into contact.

8. The vehicle pedal apparatus according to claim 7, wherein the support portion of the second arm is supported by a plurality of support ribs extending rearward.

9. The vehicle pedal apparatus according to claim 8, wherein the support ribs comprise a first rib horizontally extending rearward from the support portion and a second rib and a third rib extending obliquely upward and downward, respectively, at a predetermined angle with respect to the first rib.

10. The vehicle pedal apparatus according to claim 1, wherein the operation pin is supported by a plurality of protrusion ribs that are arranged in a circumferential direction of the operation pin.

11. The vehicle pedal apparatus according to claim 1, wherein, wherein the pedal member has a spring mechanism connected to a front end of the second arm, the spring mechanism providing elastic force to return the pedal arm from a rotated position to an original position.

12. The vehicle pedal apparatus according to claim 11, wherein the front end of the second arm has a fixing portion protruding forward, and wherein the spring mechanism includes:

a piston mechanism having a first end rotatably connected to the pedal member and a second end rotatably connected to the fixing portion; and a spring directly connected to the piston mechanism.

13. The vehicle pedal apparatus according to claim 1, wherein the pedal arm is made of a plastic material.

*14. A vehicle pedal apparatus comprising:*

*a pedal member fixed to a dashboard; and*

*a pedal arm rotatably connected to the pedal member and elongated in a vertical direction,*

*wherein the pedal arm includes:*

*a first arm that is bent sideways with respect to a front-and-rear direction of a vehicle body, to extend in a first lateral direction; and*

*a second arm that has a first side indented in a second lateral direction opposite to the first lateral direction such that the first side has a concavity, wherein the second arm is integrally connected to an upper end of the first arm in a bottom direction of the vehicle body,*

*wherein the second arm is rotatably connected to the pedal member to be rotatable in the front-and-rear direction of the vehicle body,*

*wherein the pedal arm has a pedal switch, and the second arm has an operation pin which protrudes from a second side in the second lateral direction and which connects with the pedal switch, and*

*wherein the pedal member has a master cylinder, and the second side of the second arm has a support portion with which a push rod of the master cylinder comes into contact.*

*15. A vehicle pedal apparatus comprising:*

*a pedal member fixed to a dashboard; and*

*a pedal arm rotatably connected to the pedal member and elongated in a vertical direction,*

*wherein the pedal arm includes:*

*a first arm that is bent sideways with respect to a front-and-rear direction of a vehicle body, to extend in a first lateral direction; and*

*a second arm that has a first side indented in a second lateral direction opposite to the first lateral direction such that the first side has a concavity, wherein the second arm is integrally connected to an upper end of the first arm in a bottom direction of the vehicle body,*

*wherein the second arm is rotatably connected to the pedal member to be rotatable in the front-and-rear direction of the vehicle body,*

*wherein the pedal arm has a pedal switch, and the second arm has an operation pin which protrudes from a second side in the second lateral direction and which connects with the pedal switch, and*

*wherein the operation pin is supported by a plurality of protrusion ribs that are arranged in a circumferential direction of the operation pin.*

* * * * *